United States Patent
Yang

(10) Patent No.: US 6,726,377 B2
(45) Date of Patent: Apr. 27, 2004

(54) BUTT JOINED ELECTRICAL APPARATUS AND MODULE

(75) Inventor: Kei-Wean C. Yang, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 92 days.

(21) Appl. No.: 10/154,570

(22) Filed: May 23, 2002

(65) Prior Publication Data

US 2003/0180007 A1 Sep. 25, 2003

Related U.S. Application Data

(60) Provisional application No. 60/366,357, filed on Mar. 20, 2002.

(51) Int. Cl.[7] .............................. G02B 6/36; H01R 4/24
(52) U.S. Cl. ............................ 385/92; 385/14; 385/78; 385/88; 385/89; 439/409; 439/701
(58) Field of Search ....................... 385/14, 79, 88–94; 439/409, 701

(56) References Cited

U.S. PATENT DOCUMENTS

| | | | |
|---|---|---|---|
| 4,129,897 A | * 12/1978 | Telewski et al. ............ | 361/757 |
| 4,702,547 A | 10/1987 | Enochs ......................... | 385/88 |
| 5,583,468 A | 12/1996 | Kielmeyer et al. ........... | 333/33 |
| RE35,869 E | 8/1998 | Mohwinkel .................... | 333/33 |
| 6,217,230 B1 | * 4/2001 | Matsushita ................... | 385/78 |
| 6,271,579 B1 | 8/2001 | Going et al. ................ | 257/664 |
| 6,292,052 B1 | 9/2001 | Carlson ......................... | 330/9 |

* cited by examiner

Primary Examiner—Phan T. H. Palmer
(74) Attorney, Agent, or Firm—William K. Bucher

(57) ABSTRACT

A butt joined electrical apparatus has an open end face carrier or housing on which is positioned an electrical element. An electrical device and a coplanar transmission structure is formed on the electrical element with the coplanar transmission structure disposed toward the open end face of the carrier or housing. The electrical device coupled an electrical signal to and from a mating opto-electrical apparatus or housing. The coplanar transmission structure is independently aligned in three mutually perpendicular directions and in a proximate abutting relationship with another matching coplanar transmission structure formed on an opto-electrical element of the mating opto-electrical apparatus or housing. The electrical and opto-electrical apparatuses are independently positioned and mechanically joined together with the matching coplanar transmission structures electrically coupled together via substantially flat electrical conductors.

21 Claims, 10 Drawing Sheets

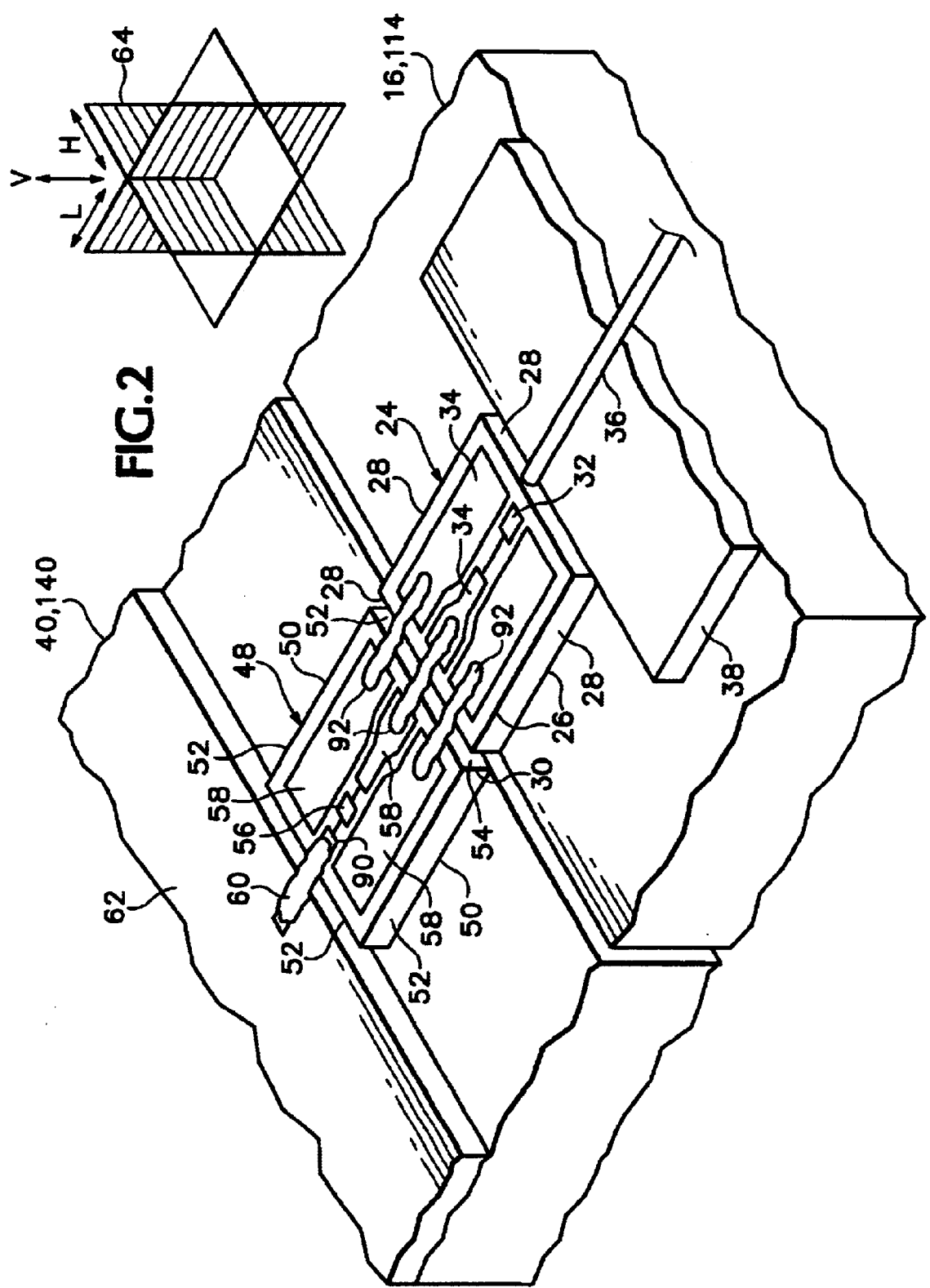

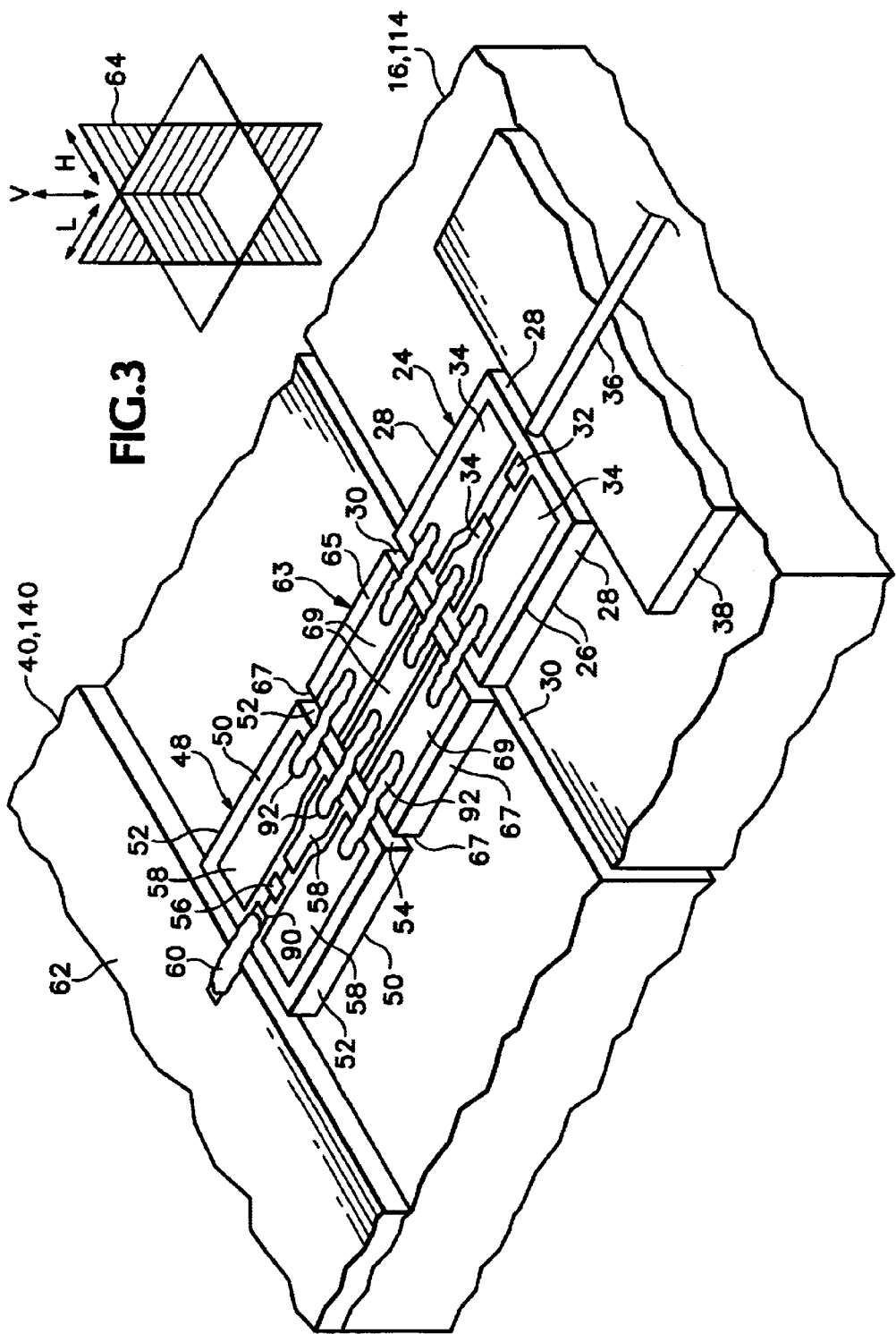

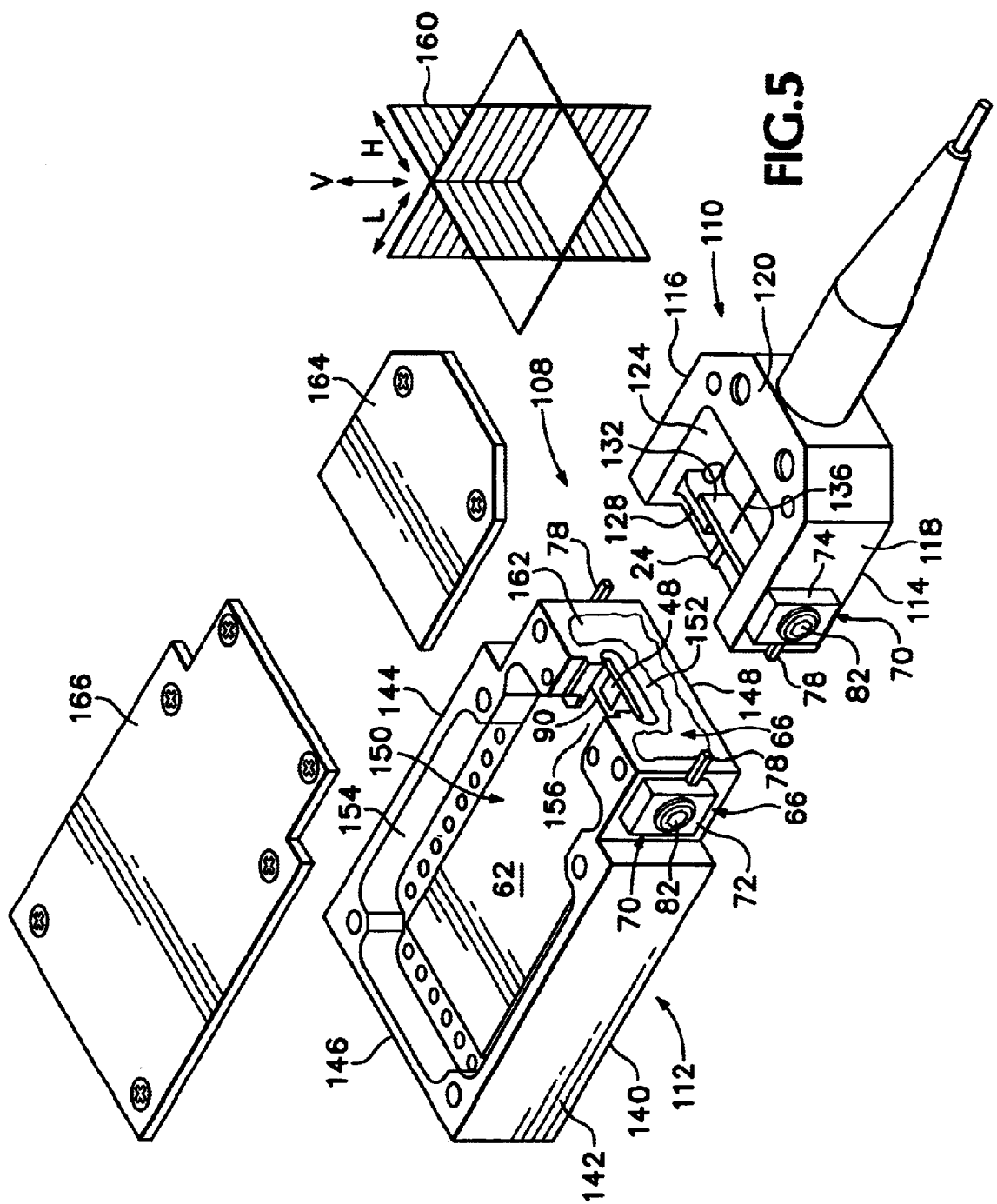

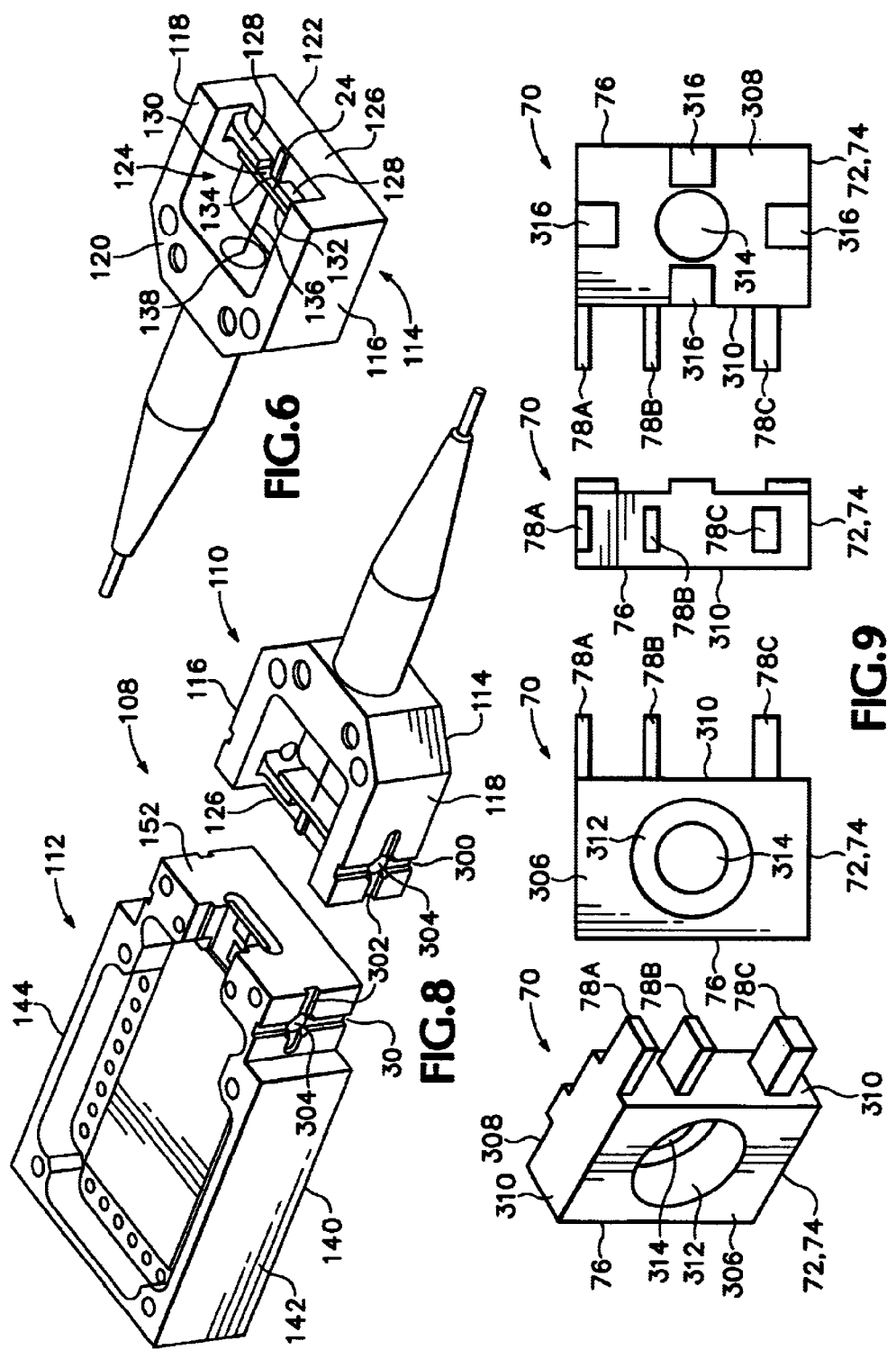

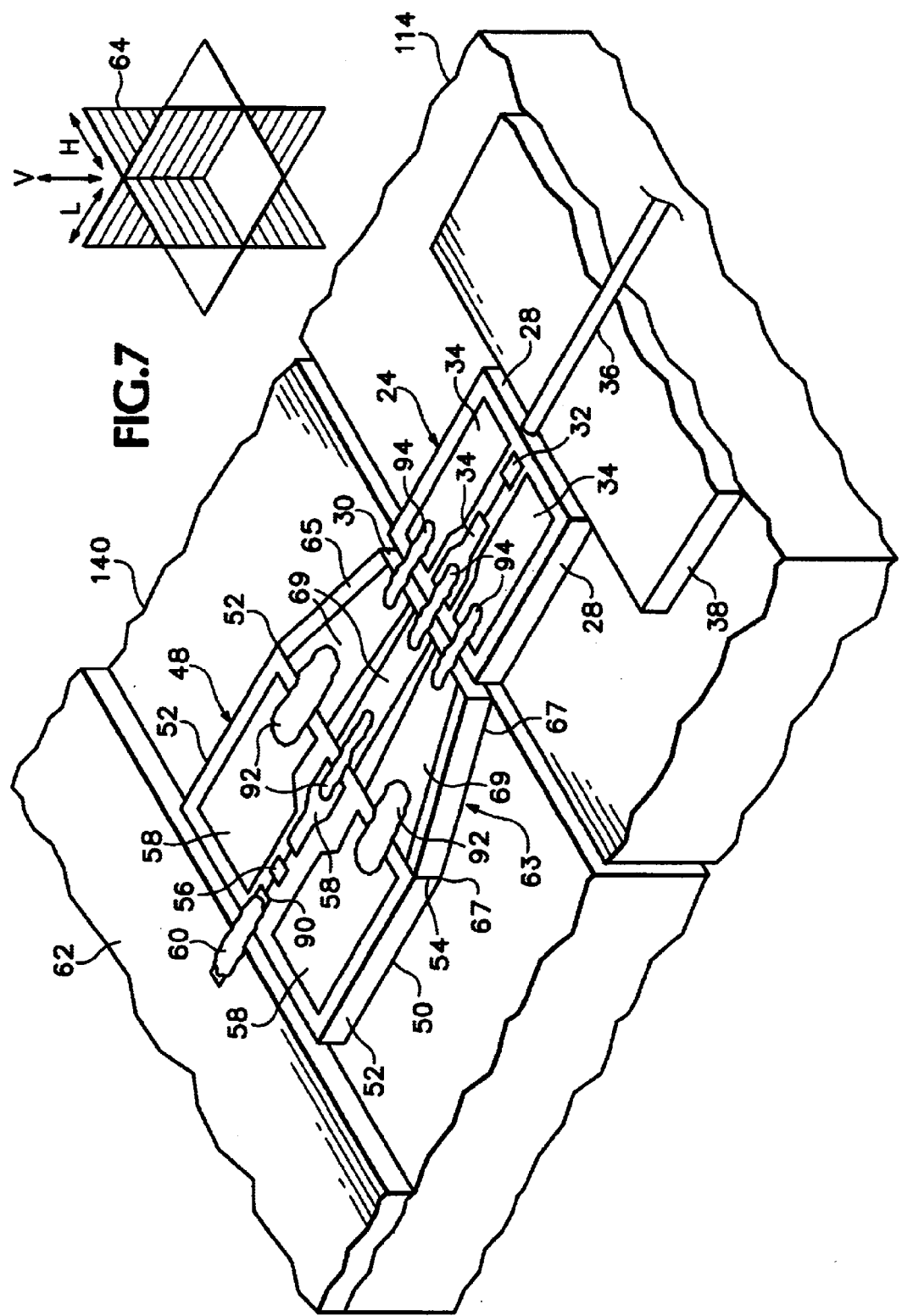

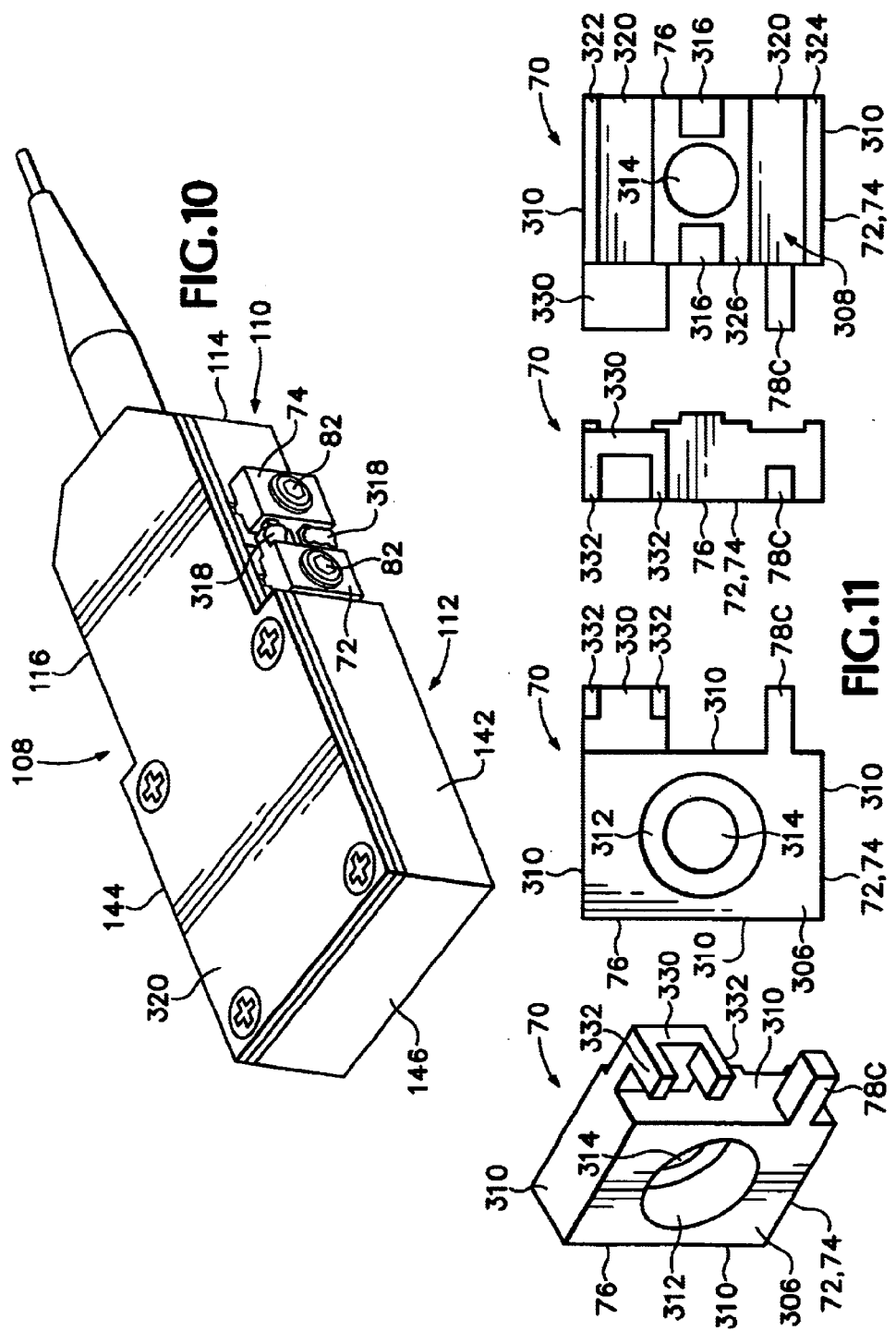

BUTT JOINED ELECTRICAL APPARATUS AND MODULE

CROSS-REFERENCE TO RELATED APPLICATION

This application claims the benefit of the U.S. Provisional Application No. 60/366,357, filed Mar. 20, 2002.

BACKGROUND OF THE INVENTION

The present invention relates generally to opto-electrical assemblies and more particularly to a butt joined electronic apparatus and module operating at millimeter wavelength frequencies.

Recent advancements in optical communications technology have demonstrated optical data demuxing at a speed of over 160 Gbit/sec through a single mode optical fiber. At the same time, there is a lack of corresponding progress in test and measurement instrumentation to support analyzing these fast optical pulses. Current solutions are limited by interconnect issues that limit bandwidth and signal integrity, and manufacturing issues that can substantially increase the cost of components. One commercial solution is to couple an enclosed photodetector module with a conventional enclosed sampling head using a coaxial transmission line. The coupled modules are mounted in an optical plug-in module for a sampling oscilloscope. Another solution is to buy a high-speed photodetector as the optical-to-electrical (O/E) converter and use a sampling oscilloscope to capture the signal. This approach seems more beneficial for users because, in addition to having to spend less money, they can also maintain the electrical input to the scope for other testing needs. The inconvenience to users is that the screen is no longer calibrated for accurate power measurements. However, this inconvenience can be overcome by purchasing a separate power meter and perform a calibration manually. Users are faced with the choice of spending more money for the added power level calibration feature of an optical plug-in module or save $10 to 15 thousand dollars by buying a photodetector separately such that both electrical inputs and optical inputs can be measured with the same investment. The latter choice also provides users with a power meter which can be used elsewhere as well.

A common weakness for the above two solutions is that they both need electrical interconnections to connect the photodetector output to the sampler input. Because of the high frequencies involved, the connectors are quite expensive. Moreover, aside from introducing additional costs to the system, these components also introduce unwanted impedance mismatching that produce signal reflections. These signal reflections result in waveform distortion as a function of bit pattern when measuring fast repetitive signals, such as the RZ 40 Gb/Sec optical data.

A solution to these problems is to combine the detector and sampler semiconductor devices together to form a fully integrated photodetector-sampler IC design. This would eliminate all of the interconnecting hardware between the photodiode and sampler. While a fully integrated photodetector-sampler design (FIPS) sounds good, it runs into practical problems during implementation. Generally, test equipment manufactures are not vertically integrated companies that have the processing technology or the equipment to produce FIPS designs. In addition, high speed photodetector manufacturers generally specialize in producing optical components, such as O/E and E/O converters, but not electrical components, such as electrical samplers. Conversely, electrical component manufactures do not manufacture optical components. To produce the FIPS design would require capital investment and technology development by optical or electrical component manufactures or the test and measurement equipment manufacturer.

Another issue with the FIPS design is yield loss of the final assembly if either of the optical detector or sampler sections develop problems. The photodiode performance cannot be accurately characterized until permanently mounted on or within a carrier or housing, an optical fiber aligned to the photodiode, and electrically coupled to the sampler section. If the output of the competed FIPS device does not meet design specifications, it is difficult to determine if the problem has to do with the fiber alignment, photonic and impulse responses of the diode, polarization sensitivity and the like in the optical detector section or signal gain, sensitivity and the like in the sampler section. Even if the performance problem can be identified to one of the sections, replacing the defective section may lead to damage of the other section.

Another problem with the FIPS design is negotiating refunds on defective parts. Since different manufacturers make the components for the optical and sampler sections and one or the other or a system integrator, such as the test and measurement manufacturer, performs the final integration, determining the cause of the failed part or parts in the sections can be a source of conflict. For example, the problem may be determined within the photodetector module, say a lower than spec photo response. The problem could have been caused by the photodiode die being damaged during the FIPS processing; the optical fiber being misaligned from the integrator assembly process; the optical fiber end surface polishing being flawed; the fiber/detector IC junction having foreign contaminations not readily visible to the eye; the wire bond from the detector IC to the sampler IC having excessive inductance introduced by improper wirebonding; the wirebonder damaging the detector IC by improper bonding control, such as excess bond head ultrasonic energy or pressure, and the like. The photodetector IC manufacturer may be reluctant to refund the cost of the multi-thousand dollars detector IC where the defect is caused by a defective assembly process.

What is needed is an electrical apparatus and module design that overcomes the shortcomings of the FIPS and the coaxial interconnect designs. The electrical apparatus and module design should allow independent testing and verification of separate sections of the assembly prior to final assembly or integration. The electrical apparatus and module should allow for easy assembly and alignment of the separate device sections down to the micron level.

SUMMARY OF THE INVENTION

Accordingly, the present invention is to a butt joined electrical apparatus and module for coupling millimeter wavelength frequency electrical signals to and from a mating opto-electrical apparatus. The butt joined electrical apparatus and module has a carrier with an open end face and an electrical element positioned on the carrier. The electrical element has an electrical device formed on at least a first horizontal surface of the carrier that is coupled to additional electrical circuitry on the. The electrical module configuration has a housing with sidewalls and end walls. A cavity is formed in the housing bounded on three sides by the sidewalls and one of the end walls. The cavity intersects the other end wall of the housing defining an open end face on the housing. The housing has the electrical element positioned in the cavity of the housing. The electrical device formed on the horizontal surface of the electrical element is coupled to additional circuitry disposed in the housing. The housing may be provided with a removable top cover that is mounted on the end wall and the sidewalls bounding the cavity.

The electrical element has a coplanar transmission structure formed on one of the horizontal surfaces that is electrically coupled to the electrical device. The coplanar transmission structure is independently aligned in three mutually perpendicular planes and positioned in a proximate abutting relationship with another matching coplanar transmission structure formed on an opto-electrical element positioned on an open end face carrier or in the cavity of a housing of the mating opto-electrical apparatus. The carrier of the electrical apparatus and the carrier of the opto-electrical apparatus are independently positioned and mechanically joined together at the open end faces as a single assembly by a securing member. The carrier of the electrical apparatus and carrier of the opto-electrical apparatus are linearly and rotationally positionable in three mutually perpendicular planes relative to each other to align the matching coplanar transmission structures of the electrical apparatus and the opto-electrical apparatus. Likewise, the housing of the electrical module and the housing of the opto-electrical module are independently positioned and mechanically joined together at the open end faces as a single module by a securing member. The housing of the electrical module and housing of the opto-electrical module are linearly and rotationally positionable in three mutually perpendicular planes relative to each other to align the matching coplanar transmission structures of the electrical apparatus and the opto-electrical apparatus. The matching coplanar transmission structures of the electrical apparatus and the opto-electrical apparatus are electrically coupled together via substantially flat electrical conductors.

In the preferred embodiment, the securing member has removable mechanical attachment members secured to the side surfaces of the first and second carriers or modules. The removable attachment members are secured on the side surfaces of the first and second carriers or modules adjacent to their respective open end faces. Each removable attachment member has first and second links secured to the respective side surfaces of the carriers and housings with each link having a base and at least a first extension member. At lest one of the extension members of each of the first and second removable attachment members projects past one of the open end faces to overlap the other extension member. The overlapping extension members are secured together to join the carriers or housings together as a single assembly or module. In the preferred embodiment, solder is applied to the overlapping extension members. Alternately, an adhesive, such as an epoxy or ultraviolet cured epoxy, may be applied to the overlapping extension members.

The electrical element may be positioned on the carrier of the electrical apparatus and in the cavity of the electronic module housing away from the open end face of the carrier and housing. The electrical element may also extend to the open end face of the carrier or housing or it may extend past the open end face of the carrier or housing. The electrical element may be positioned on the carrier or housing in any of the above positions so long as the proximate abutting relationship of the matched coplanar transmission structures of the electrical apparatus or module and the mating opto-electrical apparatus or module produce a sub-millimeter separation between the ends of the matched coplanar transmission structures. For example, the electrical element may be set back from the end face of its carrier or housing and the opto-electrical element may extend past the open end face of its carrier or housing.

A mounting dielectric substrate may be mounted on the carrier of the electrical apparatus or in the cavity of the electrical module housing. The substrate has an end face that may be positioned away from the open end face of the carrier or housing, extend to the open end face of the carrier or housing, or extend past the open end face of the carrier or housing. The electrical element is secured to the mounting dielectric substrate with the electrical element positionable away from, extending to or extending past the end face of its mounting dielectric substrate. The positioning of the substrate may be combined with the positioning of the electrical element to produce multiple positioning combinations. For example, the mounting dielectric substrate may be positioned away from the open end face of the carrier or housing with the electrical element extending past the end face of the mounting dielectric substrate. In another example, the mounting dielectric substrate may extend past the open end face of carrier or housing with the electrical element extending to the end face of the mounting dielectric substrate.

The electrical apparatus may also include a standoff dielectric substrate positioned on the open end face carrier in an abutting relationship with the electrical element. The standoff dielectric substrate has opposing vertical end walls and a horizontal surface with a coplanar transmission structure matching the coplanar transmission structure of the electrical element formed on the horizontal surface and extending to the vertical end walls. One of the opposing vertical end walls abuts the end face of the electrical element with the coplanar transmission structure on the electrical element and the coplanar transmission structure on the standoff dielectric substrate being coplanar and electrically coupled via substantially flat electrical conductors. The other end wall of the standoff dielectric substrate is disposed toward the open end face of the carrier. The standoff dielectric substrate and abutting electrical element may be positioned back from the open end face of the carrier and housings. The standoff dielectric substrate and abutting electrical element may also extend to the open end face of the carrier or housing or it may extend past the open end face of the carrier or housing. The standoff dielectric substrate and abutting electrical element may also be secured to the mounting dielectric substrate with the standoff dielectric substrate and abutting electrical element set back from the end face of the mounting dielectric substrate, extend to the end face or extend past the end face of the mounting dielectric substrate.

The electrical device formed on the electrical element may be at least a first sampling diode of a sampling circuit, a laser driver, an amplifier or the like. The opto-electrical device formed on the opto-electrical element may be an optical-to-electrical converter, such as a photodiode, a semiconductor laser, an optical modulator or other types of devices that receives an electrical signal to generate or modulate an optical device or generates an electrical signal in response to a received optical signal.

The objects, advantages and novel features of the present invention are apparent from the following detailed description when read in conjunction with appended claims and attached drawings. dr

BRIEF DESCRIPTION OF THE DRAWINGS

FIG. 2 is a detailed perspective view of the joined electrical apparatus or module with an associated opto-electrical apparatus or module in the butt joined electrical and module according to the present invention.

FIG. 3 is a detailed perspective view of the electrical apparatus or module having a standoff dielectric substrate that is joined with an associated opto-electrical apparatus or module in the butt joined electrical and module according to the present invention.

FIG. 5 is a perspective view of a second embodiment of a butt joined electrical module according to the present invention.

FIG. 6 is a front perspective view of the mating opto-electrical apparatus and module in the electrical apparatus and module according to the present invention.

FIG. 7 is a detailed perspective view of the standoff dielectric substrate joining dimensionally mismatched coplanar transmission structures of the butt joined opto-electrical module according to the present invention.

FIG. 8 is a perspective view of the housing of the butt joined electrical module according to the present invention illustrating the removable mechanical attachment members.

FIG. 9 illustrates various views of one embodiment of the links of the removable attachment members used in the butt joined electrical apparatus and module according to the present invention.

FIG. 10 is a perspective view of the joined electrical and mating opto-electrical housings of the butt joined electrical module according to the present invention.

FIG. 11 illustrates various views of a further embodiment of the links of the removable attachment members used in the butt joined electrical apparatus and module according to the present invention.

DETAILED DESCRIPTION OF THE PREFERRED EMBODIMENT

Figure 1:
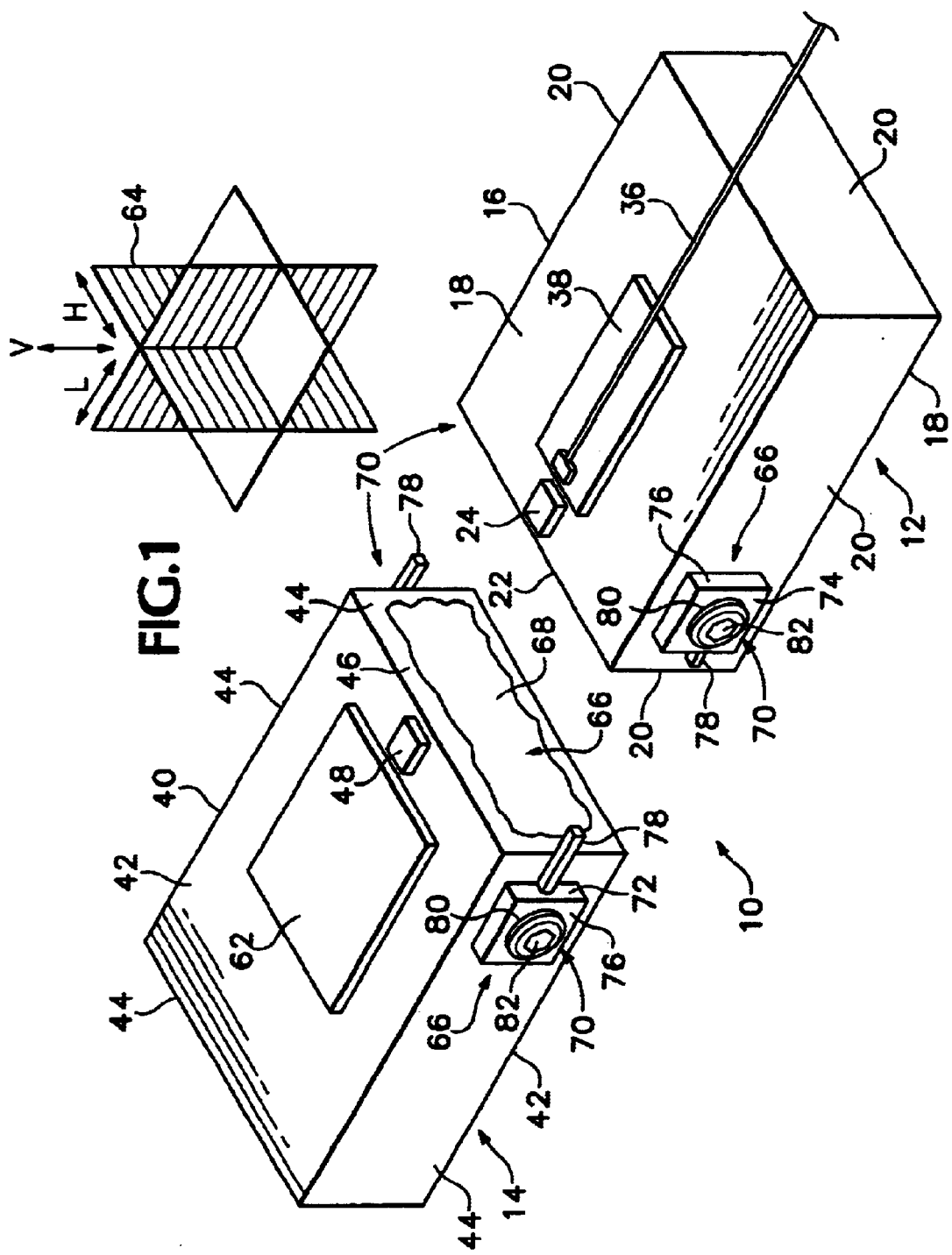
FIG. 1 is a perspective view illustrating a first embodiment of a butt joined electrical apparatus according to the present invention.

The butt joined electrical apparatus and module of the present invention is an independently positioned and mechanically joined open end faced apparatus that couples extremely high frequency electrical signals, in the range of 30 GHz. to 300 GHz, to and from a mating opto-electrical apparatus module. FIG. 1 show a perspective view of a first embodiment of a butt joined opto-electronic assembly 10 having an opto-electrical apparatus 12 and an electrical apparatus section 14. The opto-electrical apparatus 12 has a carrier 16 having opposing horizontal surfaces 18 and side surfaces 20 with one of the side surfaces defining an open end face 22. The carrier 16 is made of any suitable solid material that provides a rigid base for receiving optical or electrical components, substrates and the like. Such materials include, but not limited to, metals such as brass or the like, glass, plastic and the like. An opto-electrical element 24 is positioned on the carrier 16 and secured using an adhesive, such as a conductive or non-conductive epoxy. The opto-electrical element 24 (as best shown in FIG. 2) has opposing horizontal surfaces 26 and side surfaces 28 with one of the side surfaces defining an end face 30. An opto-electrical device 32, such as an optical-to-electrical converter implemented as a semiconductor photodiode, a semiconductor laser, an optical modulator or the like, is formed on one of the horizontal surfaces 26 of the opto-electrical element 24. A coplanar transmission structure 34 is formed on one of the horizontal surfaces 26 and has one end electrically coupled to the opto-electrical device 32. The other end of the coplanar transmission structure 34 is disposed adjacent to the end face 30 of the opto-electrical element 24. An optical waveguide 36, such as an optical fiber, may be mounted on a substrate 38 as is described in U.S. Pat. No. 4,702,547, titled "Method for Attaching an Optical Fiber to a Substrate to form an Optical Fiber Package". The optical waveguide 36 is optically aligned with the opto-electrical device 32 for coupling an optical signal to or from the opto-electrical device 32. Alternately, the optical waveguide 36 may be formed as part of the substrate 38 and optically aligned with the opto-electrical device 32. The optical fiber is then optically aligned with the substrate optical waveguide.

The electrical apparatus 14 has a carrier 40 of similar design to carrier 16 of the opto-electronic section 12 with the carrier 40 having opposing horizontal surfaces 42 and side surfaces 44 with one of the side surfaces defining an open end face 46. The carrier 40 is preferably made of the same material as the carrier 16 for the opto-electrical apparatus 12. An electrical element 48 is positioned on the carrier 40 and secured using an adhesive, such as a conductive or nonconductive epoxy. The electrical element (as best shown in FIG. 2) has opposing horizontal surfaces 50 and side surfaces 52 with one of the side surfaces defining an end face 54. The electrical element 48 is preferably formed of a semiconductor material and has an electrical device 56, such as a sampling diode, laser driver, amplifier or the like, formed on one of the horizontal surfaces 50. A coplanar transmission structure 58, matching the coplanar transmission structure 34 of the opto-electrical element 24, is formed on one of the horizontal surfaces 50 and has one end electrically coupled to the electrical device 56. The other end of the coplanar transmission structure 58 is disposed adjacent to the end face 54 of the electrical element 48. The electrical element 48 is electrically coupled via an electrical conductor 60, such as bond wires, gold foil and the like, to a substrate 62 mounted on the carrier 14 having additional electronic circuitry formed thereon.

The carriers 16 and 40 of the opto-electrical and electrical apparatus 12 and 14 are linearly and rotationally positionable relative to each other in three mutually perpendicular planes as represented by the mutually orthogonal planes 64. The apparatuses 12 and 14 are moveable up-and-down in the vertical direction, side-to-side in the horizontal direction and in-and-out in the lateral direction. A securing member 66 joins the respective carrier 16 and 40 together as a single assembly 10. The securing member 66 may take the form of an adhesive 68 applied to the abutting open end face surfaces 22 and 46 of the carriers 16 and 40. One such adhesive is an epoxy. A drawback to using a standard epoxy adhesive is the long drying time. This can be overcome by forming the carriers 16 and 40 from a transparent material and using an ultraviolet cured epoxy. A drawback to using an adhesive to secure the carriers 16 and 40 together is that it difficult to impossible to separate the joined carriers without damaging them. A preferred securing member is removable mechanical attachment members 70 that are mounted on opposing sidewalls 20 and 44 of the carriers 16 and 40 adjacent to their open end faces 22 and 46. Each attachment member 70 has respective first and second links 72 and 74 with each link having a base 76 and an extension member 78. The links 72 and 74 are preferably made of metal, such as brass, steel or the like. Each base 72 has a bore 80 formed therethough that accepts a threaded screw 82. Each screw 82 is received in a threaded aperture (not shown) formed in the sidewalls 20 and 44 of the carriers 16 and 40 and tightened to secure the links 72 and 74 to their respective carriers 16 and 40. At least one of the extension members 78 of the first and second links 72 and 74 extends past the open end face 22, 46 of its carrier. The other extension member 78 extends outward from the base 76 toward the open end face 22, 46 of its carrier. The other extension member 78 may also extend past the open end face of its carrier. As the two carriers 16 and 40 are positioned together to align the matched coplanar transmission structures 34, 58, the extension members 78 overlap each other. Once the coplanar transmission structures 34, 58 are aligned, the extension members 78 are secured together to mechanically join the carriers 16 and 40 together as one assembly. Preferably, the extension members 78 are secured together using a 60/40 tin-lead solder. Alternately, an adhesive, such as an epoxy, UV cured epoxy or a low melting temperature metal with strong adhesion like indium, can be used to secure the extension members together. An advantage of using the removable attachment members 70 is the ability to disassemble the opto-electronic assembly to replace a defective apparatus 12, 14 of the assembly if one of the sections fails. All that is mechanically required is to remove the screws 82 securing the links 72 and 74 to the carriers 14 and 40. This type of disassembly and replacement of defective components is substantially faster and safer than attempting to replace opto-electrical and electrical elements integrated onto a single substrate.

FIG. 2 is a closeup perspective view of the butt joined interface between the opto-electrical apparatus 12 and the mating electrical apparatus 14. The open end face 22 of the carrier 16 positioned in an approximate abutting relationship with the open end face 46 of the mating electrical apparatus 40. In the preferred embodiment, the opto-electronic element 24 is formed of a semiconductor material with the opto-electrical device 32 being an optical-to-electrical converter. The optical-to-electrical converter 32 is preferably a photodetector having heterojunction structures bases on III–V semiconductor materials, such as an indium-phosphate (InP) semiconductor photodiode manufactured and sold by u2t Photonics GmbH, Berlin, Germany. The photodiode 32 is formed at one end of the opto-electrical element 24 and is electrically coupled to the center conductor of the coplanar transmission structure 34 formed on the top horizontal surface of the opto-electrical element. The other end of the coplanar transmission structure 34 is disposed adjacent to the opposing end face 30 of the opto-electrical element 24. The opto-electrical element 24 is positioned and secured to the carrier 14 with the end face 30 adjacent to the open end face 22 of the carrier to provide micron separation between the matched coplanar transmission structures 34 and 58. Electrical leads (not shown) couple electrical power to the semiconductor photodiode 32. The dielectric substrate 38 has the optical waveguide 36 formed therein and is positioned adjacent to and optically aligned with the photodiode 32 to provide optimum optical energy input to the photodiode. An optical fiber is optically aligned with the waveguide 36 for coupling an optical signal through the waveguide 36 and onto the photodiode 32.

Alternately, the opto-electrical device 32 may be formed on one of the horizontal surfaces 26 of the opto-electrical element 24 and the coplanar transmission structure 34 may be formed on the opposing horizontal surface 26. Electrically conductive vias couple the electrical output of the opto-electrical device 32 to the coplanar transmission structure 34.

The electrical element 48 is preferably a gallium-arsenide semiconductor device having at least a first sampling diode 56 formed thereon forming a sampling circuit. Preferably, the semiconductor device has more than one sampling diode 56 forming the sampling circuit, such as the sampling circuit described in U.S. Pat. No. 6,292,052, titled "Output Amplifier for a Discrete Filter-Les Optical Reference Receiver". The sampling diode or diodes 56 are electrically coupled to the center conductor of the coplanar transmission structure 58 that extend from the end face 54 of the electrical element 48. The sampling diode or diodes 56 are electrically coupled to a conductive contact pad 90 formed on the top surface 50 of the electrical element 48 at the opposite end of the electrical element 48. The substantially flat electrical conductor 60 couples the sampled electrical signal from the sampling diode or diodes 56 to the additional circuitry formed on an adjacent substrate 62. Such circuitry may include amplifiers, summing circuits and the like. Electrical leads (not shown) couple electrical power and biasing voltages to the electrical element 48. As was described for the opto-electronic element 24, the electrical element 48 may be formed on one of the horizontal surfaces 50 and the coplanar transmission structure 58 may be formed on the opposing horizontal surface 50. Electrically conductive vias couple the electrical output of the electrical device 56 to the coplanar transmission structure 58.

The carriers 16 and 40 are position in an alignment mount with at least one of the carriers being linearly and rotationally moveable in the three mutually perpendicular directions relative to the other carrier. The carriers 16 and 40 are positioned to align the matched coplanar transmission structures 34 and 58 in a proximate abutting relationship. The lateral separation of the matching coplanar transmission structures 34 and 58 is in the sub-millimeter range with the preferred lateral separations being as small as possible. The matched coplanar transmission structures 34 and 58 are aligned such that the end faces of the opto-electronic and electrical elements 30 and 54 are parallel to each other and the coplanar transmission structures 34 and 58 lay in the same plane. Once the matched coplanar transmission structures 34 and 58 are aligned in the abutting relationship, the carriers 16 and 40 are joined together by one of the above described securing members 66. The matched coplanar transmission structures 34 and 58 are then electrically coupled together using substantially flat electrical conductors 92, such as wedge bonded gold ribbon wire, bond wires or the like.

The coplanar transmission structures 34 and 58 are preferably impedance and dimensionally matched in a 50 ohm environment. However, the use of different substrate materials for the opto-electrical and electrical elements 24 and 48 may result in 50 ohm coplanar transmission lines of differing dimensions on one of the opto-electrical or electrical elements 24 and 48. Further, the patterned coplanar transmission structure 34 formed on the electrical element 24 is formed of thin layers of gold over an adhesion material, such as titanium and/or platinum plating. Excessive probing or wire or wedge bonding to the coplanar transmission structures 34 will remove portions of the gold layer destroying the electrical connectivity of the transmission structure. The flexibility and robustness of the electronic apparatus 11 may be increased by adding a standoff dielectric substrate 63 as shown in FIG. 3. The standoff dielectric substrate 63 has opposing horizontal surfaces 65 and opposing vertical end walls 67 with a coplanar transmission structure 69 formed on one of the horizontal surfaces that matches the characteristics of the coplanar transmission structures 34 and 58 formed on the opto-electrical and electrical elements 24 and 48. The standoff dielectric substrate 63 is formed of a dielectric material, such as aluminum oxide or the like, with the coplanar elements of the coplanar transmission structure 69 extending to the end walls 67 of the substrate 63. This structure is in contrast to current standoff dielectric substrates where the coplanar transmission structure does not extend to the end walls of the substrate. This is due to the method of manufacturing the standoff dielectric substrates. The traditional method of manufacturing standoff dielectric substrates is to lay down multiple coplanar transmission structures on the dielectric substrate. The dielectric substrate is then laser scribed and the individual standoff dielectric substrates are snapped off from the larger dielectric substrate. The resulting standoff dielectric substrate has vertically jagged end walls due to the snapping off process.

Extending the coplanar elements of the coplanar transmission structure 69 to the end walls 67 of the standoff dielectric substrate 63 decreases the separation between the coplanar transmission structures 34 and 58 on opto-electrical and electrical elements 24 and 48 and the coplanar transmission structure 69 on the standoff dielectric substrate 63. The process for producing a standoff dielectric substrate 63 with a coplanar transmission structure 69 extending to the end walls 67 of the substrate requires the use of low temperature soluble wax to protect the coplanar transmission structure during processing. A number of coplanar waveguide structures 69 are formed on a wafer of dielectric material using a thin layer of gold. The low temperature water soluble wax, such as Crystal Bond or the like, is placed over the coplanar transmission structures 69 to protect the structures during manufacture. Tape is placed over the wax to prevent the wax from being washed off during processing and to prevent the standoff dielectric substrates 63 from being lost during processing. The wafer of dielectric material is then sawn on a line that intersects the coplanar elements of the coplanar transmission line structures 69. A coolant, such as a water jet, is applied to the wafer during the sawing process to prevent heat buildup. The wax is used to prevent the coplanar transmission structures 69 from lifting off the wafer during the sawing process. The tape prevent the protects the water soluble wax from being removed by the water jet. After the end walls 67 of each of the standoff dielectric substrates 63 are cut, the tape is removed and the water soluble wax is washed off the finished substrates 63. The standoff dielectric substrate 63 is positioned on the carrier 40 of the electrical apparatus 14 in an abutting relationship with the electrical element 48 and secured using an adhesive, such as a conductive or non-conductive epoxy.

In an alternate cutting process, the standoff dielectric substrate 63 may be cut in situ on the carrier 40. The standoff dielectric substrate 63 is formed using the above described process with the initial length of the substrate 63 being longer than needed. The standoff dielectric substrate 63 is mounted on the carrier 40 abutting the end face 46. The water soluble wax is applied to the standoff dielectric substrate 63 and the tape is applied over the wax. The standoff dielectric substrate 63 and the carrier 40 are then sawn together with the result being the standoff dielectric substrate 63 abutting the end face 46 of the carrier 40.

The inductance of the coplanar transmission structure 69 should match the inductance of the coplanar transmission structures 34 and 58. Where the coplanar transmission structures 34 and 58 are dimensionally matched, as in FIG. 3, the coplanar elements of the coplanar transmission structure 69 of the standoff dielectric substrate 63 has the same dimensions across the substrate. Where the coplanar transmission structures 34 and 58 are dimensionally mismatched, the dimensions of the coplanar elements of the coplanar transmission structure 69 of the standoff dielectric substrate 63 transition across the substrate from the dimension of the one coplanar transmission structure to the dimension of the other coplanar transmission structure while maintaining the characteristic impedance from one coplanar transmission structure to the other.

Figure 4A:
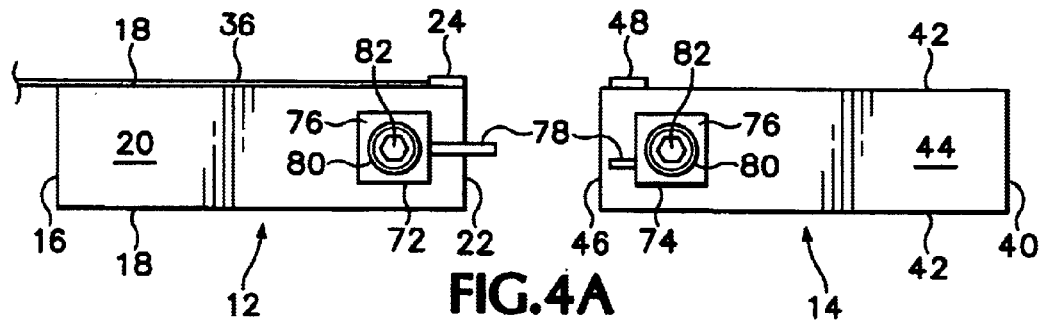
FIGS. 4A–4L are side views of various positioning configurations of the electrical element in the butt joined electrical assembly and module according to the present invention.
Figure 4B:
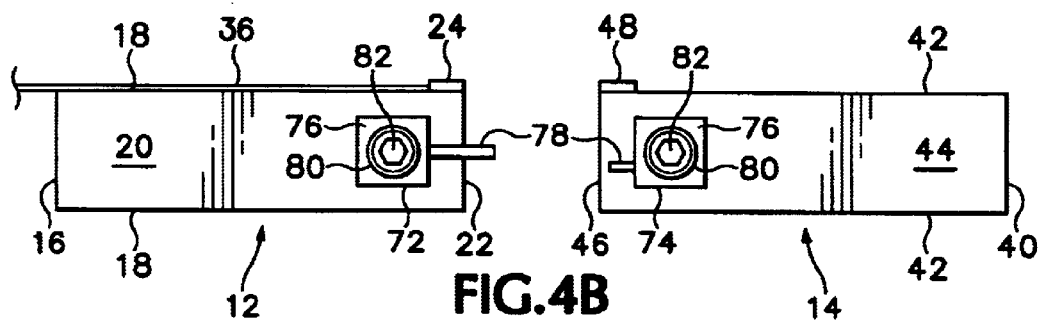
Figure 4C:
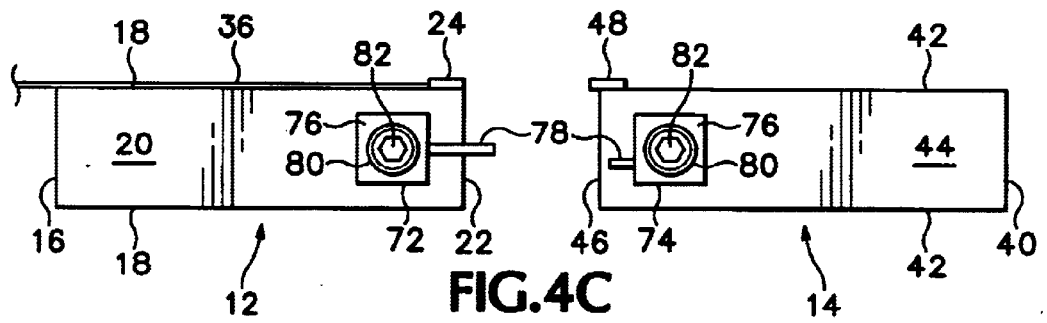

FIGS. 4A through 4L illustrate various positioning configurations for the electrical element 48 on the electronic apparatus 14 of the present invention. Like elements of the previous drawing figures are labeled the same in FIGS. 4A through 4L. FIG. 4A shows the electrical element 48 recessed back from the end face 46 of the carrier 40. The setback of the electrical element 48 in relation to the electrical opto-element 24 on the mating opto-electrical apparatus, that is the combined setback of both elements, is less than one millimeter. For example, the electrical element 48 may be setback 900 microns from the end face 46 and the opto-electrical element 24 setback 90 microns from the end face of its carrier. FIG. 4B illustrates the electrical element 48 extending to the end face 46 of the carrier 40 and FIG. 4C illustrates the electrical element 48 extending past the end face 46 of the carrier 40.

Figure 4D:
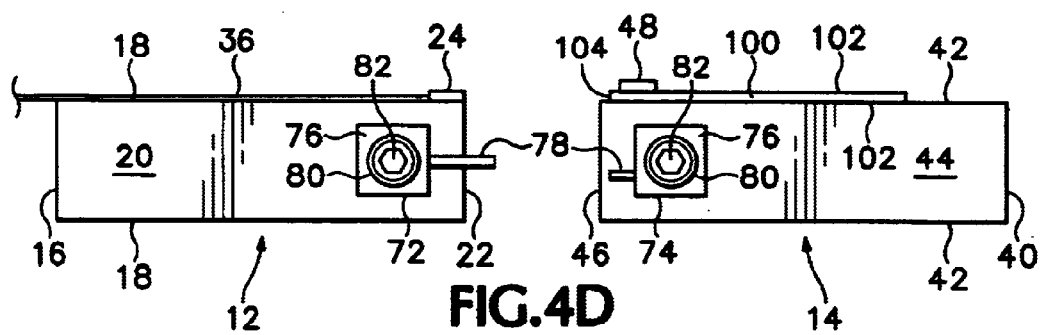
Figure 4E:
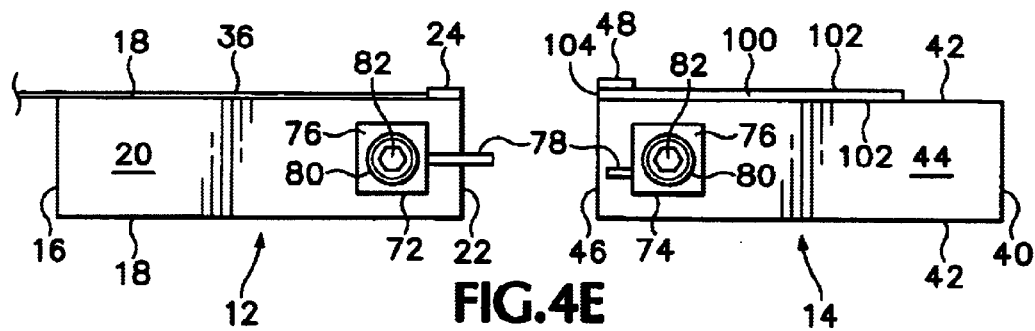
Figure 4F:
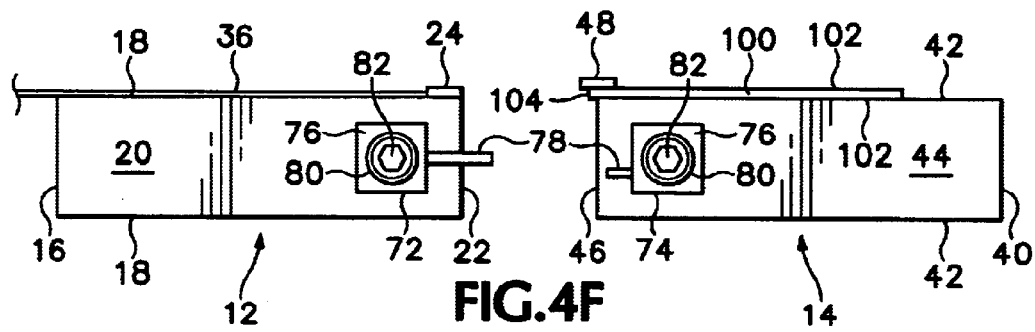

The electrical apparatus 14 may be provided with a mounting dielectric substrate 100. The mounting dielectric substrate has opposing horizontal surfaces 102 and an end face 104 and may be formed of a alumina-oxide material or similar non-conducting material. FIG. 4D illustrates the positioning of a mounting dielectric substrate 100 on the carrier 40 of the electrical apparatus 14 with the electrical element 48 secured to the mounting dielectric substrate 100. The mounting dielectric substrate 100 is shown recessed from the open end face 46 of the carrier 40 with the electrical element 48 recessed from the end face 104 of the mounting dielectric substrate 100. FIG. 4E illustrates the positioning of the mounting dielectric substrate 100 on the carrier 40 at the end face 46 of the carrier 40 with the electrical element 48 extending to the end face 104 of the mounting dielectric substrate 100. FIG. 4F illustrates the positioning of mounting dielectric substrate 100 on the carrier 40 with the mounting dielectric substrate 100 extending past the end face 46 of the carrier 40 and the electrical element 48 extending past the end face 104 of the mounting dielectric substrate 100.

The above illustrated examples of the positioning of the electrical element 48 on the carrier 40 and the positioning of the mounting dielectric substrate 100 on the carrier 40 and the positioning of the electrical element 48 on the mounting dielectric substrate 100 represent some but not all of the possible positioning configuration for the electronic apparatus 14. Each of the positioning locations for the electrical element 48 on the carrier 40 may equally be used in positioning the electrical element 48 on the mounting dielectric substrate 100.

Figure 4G:
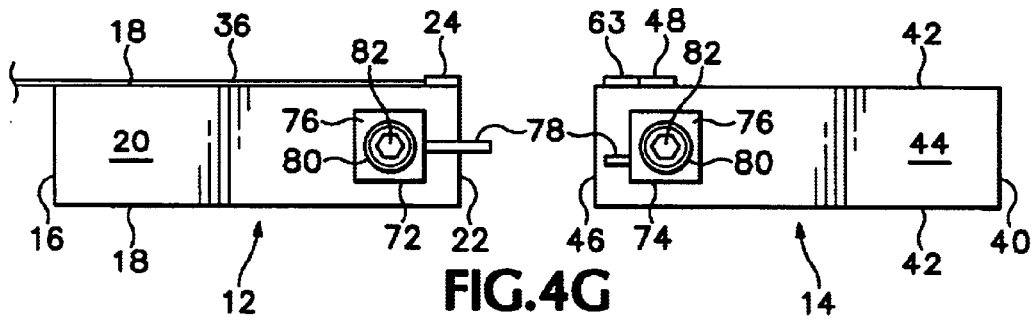
Figure 4H:
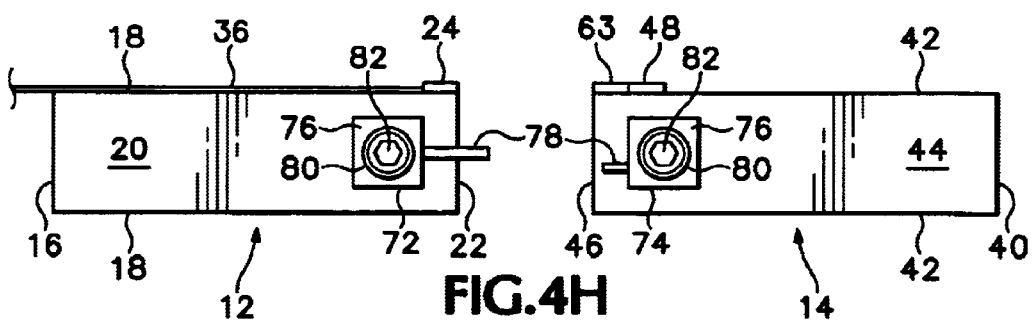
Figure 4I:
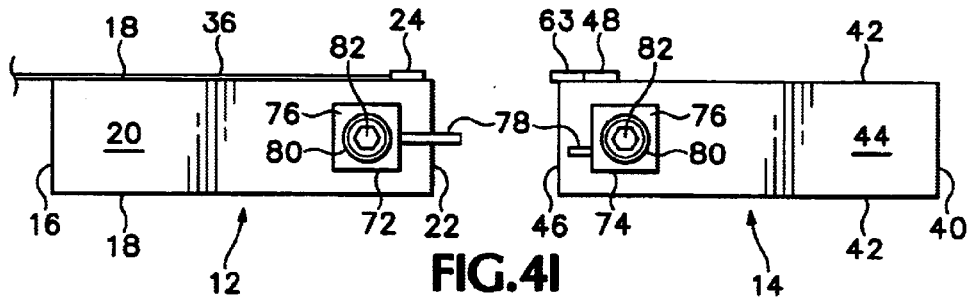
Figure 4J:
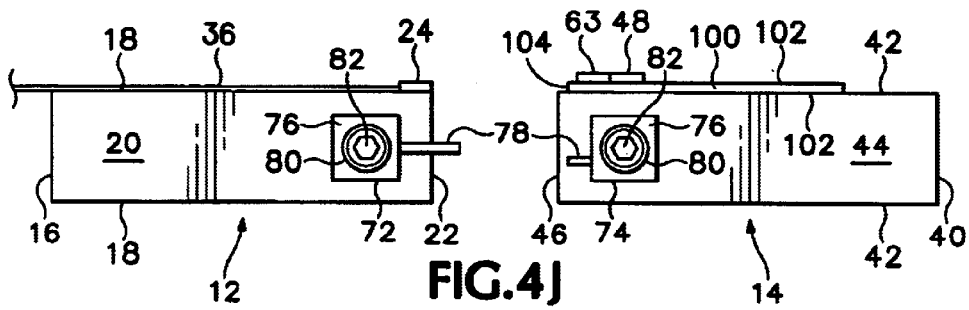
Figure 4K:
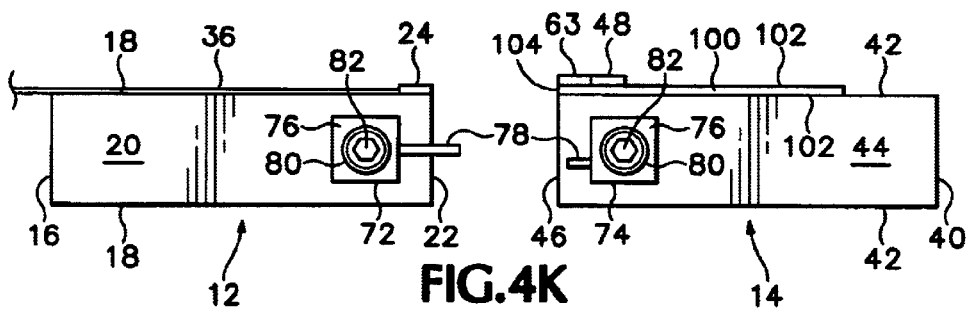
Figure 4L:
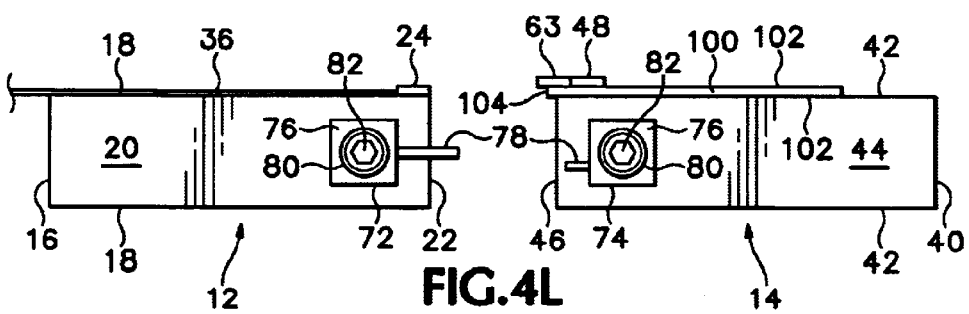

FIG. 4G shows the standoff dielectric substrate 63 and abutting electrical element 48 recessed back from the end face 46 of the carrier 40. FIG. 4H illustrates the standoff dielectric substrate 63 abutting electrical element 48 extending to the end face 46 of the carrier 40 and FIG. 4I illustrates the standoff dielectric substrate 63 abutting the electrical element 48 extending past the end face 46 of the carrier 40. The electrical apparatus 14 may be provided with a mounting dielectric substrate 100 as previously described in relation to FIGS. 4D–4F. FIG. 4J illustrates the positioning of a mounting dielectric substrate 100 on the carrier 40 of the electrical apparatus 14 with the electrical element 48 and the standoff dielectric substrate 63 secured to the mounting dielectric substrate 100. The mounting dielectric substrate 100 is shown recessed from the open end face 46 of the carrier 40 with the standoff dielectric substrate 63 and abutting electrical element 48 recessed back from the end face 104 of the mounting dielectric substrate 100. FIG. 4K illustrates the mounting dielectric substrate extending to the end face 46 of the carrier 40 with the standoff dielectric substrate 63 and abutting electrical element 48 extending to the end face 104 of the mounting dielectric substrate 100. FIG. 4L illustrates the mounting dielectric substrate 100 positioned on the carrier 40 and extending past the open end face 46 of the carrier 40 with the standoff dielectric substrate 63 abutting the electrical element 48 extending past the end face 104 of the mounting dielectric substrate 100.

The above illustrated examples of the positioning of the standoff dielectric substrate 63 with the electrical element 48 on the carrier 40 and the positioning of the mounting dielectric substrate 100 on the carrier 40 and the positioning of the standoff dielectric substrate 63 with the electrical element 48 on the mounting dielectric substrate 100 represent some but not all of the possible positioning configuration for the electronic apparatus 14. Each of the positioning locations for the standoff dielectric substrate 63 with the electrical element 48 on the carrier 40 may equally be used in positioning the standoff dielectric substrate 63 with electrical element 48 on the mounting dielectric substrate 100.

Referring to FIG. 5, there is shown a perspective view of a second embodiment of a butt joined opto-electronic assembly and module 108. The butt joined opto-electronic module 108 has an opto-electrical module 110 and an electrical module 112. The opto-electrical module 110 has a housing 114 having sidewalls 116 and 118 and end walls 120 and 122 forming a cavity 124 within the housing 114 as shown in the perspective view of the opto-electrical housing 114 in FIG. 6. The housing 114 is preferably made of metal, such as brass or the like. Alternately, the housing may be made of solid materials, such as plastic, glass or the like. The cavity 124 is bounded on three sides by the sidewalls 116 and 118 and one of the end walls 120. The cavity 124 intersects the other end wall 122 defining an open end face 126 on the housing 114. Opposing support members 128 extend part way into the cavity 124 from the sidewalls 116 and 118 forming a gap 130 there between that support an optical waveguide alignment member 132. The alignment member 132 had an aperture 134 formed therein that receives an optical waveguide 136 in the form of an optical fiber. The optical fiber 136 extends through an aperture 138 formed in the bounding end wall 122 of the cavity 124. The optical fiber 136 is optically aligned with the opto-electrical device 32 formed on the opto-electrical element 24 that is positioned in the cavity 124. The opto-electrical element 24 has the same structure and elements as previously described with the opto-electrical element 24 having the coplanar transmission structure 34 formed on one of the horizontal surfaces 26 of the opto-electrical element 24. Once the optical fiber 136 is aligned with the opto-electrical device 32, the alignment member 132 is secured to the support members 128. As previously stated, the optical waveguide 136 may be formed as part of a substrate 38 that is aligned with the opto-electrical device 32. The optical fiber is then optically aligned with the substrate optical waveguide 136.

The electrical module 112 has a housing 140 having sidewalls 142 and 144 and end walls 146 and 148 forming a cavity 150 within the housing 140. The housing 140 is preferably made of metal, such as brass or the like. Alternately, the housing 140 may be made of solid materials, such as plastic, glass or the like. The cavity 150 is bounded on three sides by the sidewalls 142 and 144 and one of the end walls 146. The cavity 150 intersects the other end wall 148 defining an open end face 152 on the housing 140. In the preferred embodiment, the cavity 150 transitions from a larger cavity area 154 to a smaller cavity area 156 that intersects the open end face 152 of the housing 140. The transition allows the joining of the opto-electrical module 110 to the electrical module 112. The electrical element 48 is positioned in the smaller cavity area 156 adjacent to the open end face 152 of the housing 140. The electrical element 48 has the same structure and elements as previously described with the electrical device 56 and coplanar transmission structure 58 formed on one of the horizontal surfaces 50 of the electrical element 48. A substantially flat electrical conductor 60 couples the sampled electrical signal from the sampling diode or diodes to additional circuitry formed on the adjacent substrate 62. Such circuitry may include amplifiers, summing circuits and the like.

The housings 114 and 140 of the opto-electrical and electrical modules 110 and 112 are linearly and rotationally positionable relative to each other in three mutually perpendicular planes as represented by the mutually orthogonal planes 160. The modules 110 and 112 are moveable up-and-down in the vertical direction, side-to-side in the horizontal direction and in-and-out in the lateral direction. The opto-electrical and electrical modules 110 and 112 are joined together as a single opto-electronic module with the securing members 66 previously described for the carrier members 16 and 40. An adhesive 162, such as an epoxy or UV cured epoxy, may be applied to the open end faces 126 and 152 of the housings 114 and 140 to secure then together. Preferably, the modules 110 and 112 are joined together by the removable mechanical attachment members 70 that are mounted on the exterior of the sidewalls 118, 140 and 116 and 144 of the housings 114 and 140. The two sets of attachment member links 72, 74 are mounted to the sidewalls 118, 140 and 116 and 144 adjacent to the open end faces 126 and 152 of the respective housings 114 and 140 with threaded screws 82. At least one of the extension members 78 of each of the link sets 72, 74 extends from the base 76 past the open end face 126, 152 of its housing 114 and 140. The other extension member 78 extends outward from the base 76 toward the open end face 126, 152 of its housing 114, 140. The other extension member may also extend past the open end face of its housing. As the two housings 114 and 140 are positioned together to align the matched coplanar transmission structures 34 and 58, the extension members 78 overlap each other. Once the coplanar transmission structures 34 and 58 are aligned, the extension members 78 are secured together to mechanically join the carriers together as one assembly.

The alignment of the matching coplanar transmission structures 34 and 58 on the opto-electrical and electrical elements 24 and 48 and the joining of the housing 114 and 140 to form a single opto-electronic module 108 are the same as was described for the aligning the matching coplanar transmission structures 34 and 58 on the opto-electrical and electrical elements 24 and 48 and joining the carriers 16 and 40 together as one assembly 10 shown in FIG. 2. The housings 114 and 140 are position in an alignment mount with at least one of the housings being linearly and rotationally moveable in the three mutually perpendicular directions relative to the other housing. The housings 114 and 140 are positioned to align the matched coplanar transmission structures 34 and 58 in a proximate abutting relationship. The matched coplanar transmission structures 34 and 58 are aligned such that the end faces 30 and 54 of the opto-electronic and electrical elements 24 and 48 are parallel to each other and the coplanar transmission structures 34 and 58 lay in the same plane. Once the matched coplanar transmission structures 34 and 58 are aligned in the abutting relationship, the housings 114 and 140 are joined together by one of the above described securing members 66. The matched coplanar transmission structures 34 and 58 are then electrically coupled together using substantially flat electrical conductors 92, such as wedge bonded gold ribbon wire, bond wires or the like. Each housing 114 and 140 may be fitted with a removable cover 164, 166 that is secured to the respective sidewalls and end wall defining each of the cavities 124 and 150 to prevent stray signals from interfering with the electrical signals of the opto-electronic module 10 and to prevent foreign materials from entering the module. Alternately, the individual covers 164 and 166 may be combined into a single removable cover that is secured to the sidewalls and end walls defining the cavities 124 and 150.

The positioning of the electrical element 48 in the cavity 150 of the housing 140 of the electronic module 112 is the same as described for the positioning of the electrical element 48 on the carrier 40 of the opto-electrical apparatus 14 as representatively illustrated in the examples of FIGS. 4A through 4F. The electrical element 48 is positionable away from the open end face 152 of the housing 140, or the electrical element 48 can extend to or extend past the open end face 152 of the housing 140. The electrical element 48 may also be secured to the mounting dielectric substrates 100 that is positioned in the cavity 150 of the housing 140 as previously described. The mounting dielectric substrate 100 may be positioned away from the open end face 152 of the housing 140, or the substrate may extend to the open end face 152 of the housing 140, or extend past the open end face 152 of the housing 140. The positioning locations for the electrical element 48 in the cavity 150 may equally be used in positioning the electrical element 48 on the mounting dielectric substrate 100.

The standoff dielectric substrate 63 may also be used in the abutting relationship with electrical element 48 positioned in the cavity of the housing 140. FIG. 7 is a closeup perspective view illustrating the coplanar transmission structure 58 on the electrical element 48 abutting the coplanar transmission structure 69 on the standoff dielectric substrate 63. Like elements from the previous drawings are labeled the same in FIG. 7. The opto-electrical element 24 on the mating electrical module 114 has a coplanar transmission structure 34 that is dimensionally different from the coplanar transmission structure 58 on the electrical element 48. The coplanar transmission structure 69 at the opposing end walls 67 of the standoff dielectric substrate 63 matches the dimensions of the coplanar transmission lines 34 and 58 formed on the opto-electrical and electrical elements 24 and 48. Between the opposing end walls 67, the each of the planar structures coplanar transmission structure 69 dimensionally transitions from one coplanar transmission structure dimension to the other coplanar transmission structure dimension. Different dimensioned electrical conductors corresponding to the dimensions of the different sized coplanar transmission structures electrically coupled the coplanar transmission structures together.

The positioning of the standoff dielectric substrate 63 and abutting the electrical element 48 on the carrier 40 as previously described also may be applied to positioning of the standoff dielectric substrate 63 and electrical element 48 in the cavity 150 of the housing 140 of the electronic module 112 as representatively illustrated in the examples of FIGS. 4G through 4L. The standoff dielectric substrate 63 and abutting electrical element 48 is positionable away from the open end face 152 of the housing 140, or the standoff dielectric substrate 63 abutting the electrical element 48 can extend to or extend past the open end face 152 of the housing 140. The standoff dielectric substrate 63 and abutting electrical element 48 may also be secured to the mounting dielectric substrates 100 that is positioned in the cavity 150 of the housing 140 as previously described. The mounting dielectric substrate 100 may be positioned away from the open end face 152 of the housing 140, or the substrate may extend to the open end face 152 of the housing 140, or extend past the open end face 152 of the housing 140. The positioning locations for the standoff dielectric substrate 63 and abutting electrical element 48 in the cavity 150 may equally be used in positioning the standoff dielectric substrate 63 and abutting electrical element 48 on the mounting dielectric substrate 100.

Referring to FIG. 8, there is shown a perspective view of the housings 114, 140 of the opto-electronic module 108 illustrating in greater detail the removable mechanical attachment members 70. Like elements from previous drawing figures are labeled the same. Orthogonal channels 300, 302 are preferably formed in the sidewalls 116, 118, 142, 144 of each of the housings 114, 140 adjacent to the respective open end faces 126, 152 with the horizontal channels 302 extending to the open end faces. A threaded aperture 304 is formed at the intersection of the orthogonal channels 300, 302. FIG. 9 illustrates various views of one embodiment of the links 72, 74 of the removable attachment members 70 that are secured to the sidewall 116, 118, 142, 144. Each link 72, 74 has a base 76 having a front 306, a back 308 and sides 310 with extension members 78A, 78B, 78C extending from one of the sides 310 of the base 76. The extension members 78A, 78B and 78C may be plated with a layer of tin-lead to aid in soldering the extension members together. Two extension member 78A, 78B are closer together than a third member 78C with the closely spaced extension members 78A, 78B being thinner than the third extension member 78C. The base 76 has two coaxially aligned bores 312, 314 formed therein with the first bore 312 extending into the base 76 from the front 306 and having a larger diameter than the second bore 314 that extends through the base 76 to the back 308. The larger sized bore 312 receives the head of the threaded cap screw 82 with the shank of the screw extends through the second bore 314. The threads of the screw 82 engage the threaded aperture 304 in one of the sidewalls 116, 118, 142, 144 of the housings 114, 140. The back 308 of the base 76 has pedestal feet 316 extending toward the second bore 314 in the base. Each of the pedestal feet 316 bisects one of the sides 310 of the base 76. Two of the pedestal feet 316 engage one of the horizontal channels 302 formed in the sidewalls 116, 118, 142, 144 of the housings 114, 140 and two of the pedestal feet 316 engage the associated vertical channel 300 formed in the sidewalls 116, 118, 142, 144 of the housings 114, 140. The depth of the pedestal feet 316 are greater than the depth of the channels 300, 302 to prevent the total surface of the back 308 of the base 76 from touching the sidewalls 116, 118, 142, 144 of the housings 114, 140. This prevents the links 72, 74 from transferring excessive heat to the housing 114, 140 during the soldering of the extension members 78A, 78B, 78C. The positioning of the extension members 78A, 78B, 78C on the side 310 of the base 76 allows one link design to be used on both housings 114, 140. For example, the link 72 on the electrical module 112 has the closely spaced extension members 78A, 78B positioned toward the top of the housing 140 and the thicker extension member 78C toward the bottom of the housing 140. The link 74 on the opto-electrical module 110 has the thicker extension member 78C toward the top of the housing 114 and the two closely spaced extension members 78A, 78B toward the bottom of the housing 114. When the two housing 114, 140 are brought together, the thicker extension member 78C on the link 72 secured to the electrical module 112 extends in between the two closely spaced extension members 78A, 78B on the link 74 secured to the opto-electrical module 110. Likewise, the thicker extension member 78C on the link 74 secured to the opto-electrical module 110 extends in between the two closely extension members 78A, 78B on the link 72 secured to the electrical module 112. FIG. 10 is a perspective view of the opto-electrical module 110 and the electrical module 112 joined together as an opto-electronic module 108. The modules 110, 112 have been positioned to align the matched coplanar transmission structures 34 and 58. The extension members 78A, 78B, 78C of the links 72, 74 are overlapped and secured together with solder, an adhesive, such as epoxy or a low melting temperature metal with strong adhesion like indium 318. The amount of extension member overlap is preferably 0.040 inches. A single cover 320 is secured to the opto-electrical and electrical modules 110 and 112 to prevent foreign material from entering the opto-electrical module 108 and to prevent stray signals from interfering with the electrical signals of the opto-electronic module 108.

FIG. 11 shows a further embodiment for the links 72, 74 of the removable mechanical attachment members 70. Like elements from the previous drawing figures are labeled the same. Each link 72, 74 has a base 76 with front 306, back 308 and sides 310. The base 76 has two coaxially aligned bores 312, 314 formed therein with the first bore 312 extending into the base 76 from the front 306 and having a larger diameter than the second bore 314 that extends through the base 76 to the back 308. The larger sized bore 312 receives the head of the threaded cap screw 82 with the shank of the screw extends through the second bore 314. Two parallel recessed channels 320 are formed in the back 308 of the base 76 defining two ribs 322, 324 adjacent to two of opposing sides and a central platform 326 of equal height with the ribs 322, 324. Two axially aligned pedestal feet 316 are formed on the central platform 326 extending from the other opposing sides 310 toward the second bore 314 in the base. The pedestal feet 316 engage one of the horizontal channels 302 formed in the sidewalls 116, 118, 142, 144 of the housings 114, 140.

The closely spaced extension members 78A, 78B extending from one of the sides of the links 72, 74 are replaced with a solid extension member 330 having tangs 332 extending in a perpendicular direction from the solid extension member 330 toward the front of the base. The thicker extension member 78C is still retained in the embodiment. When the two housing 114, 140 are brought together, the thicker extension member 78C on the link 72 secured to the electrical module 112 extends in between the two tangs on ths solid extension member on the link 74 secured to the opto-electrical module 110. Likewise, the thicker extension member 78C on the link 74 secured to the opto-electrical module 110 extends in between the two tangs on the solid extension member on the link 72 secured to the electrical module 112. The overlapping extension members 330 and 78C are secured together with solder or the like. The ribs and central platform prevent the total surface of the back 308 of the base 76 from touching the sidewalls 116, 118, 142, 144 of the housings 114, 140. This prevents the links 72, 74 from transferring excessive heat to the housing 114, 140 during the soldering of the extension members 330 and 78C.

Various embodiments of a butt joined electrical apparatus and module have been described with the various embodiments providing an electrical apparatus that allows coupling of millimeter wavelength frequency electrical signals to an from a mating opto-electrical apparatus and module. The electrical apparatus and module has an electrical element having an electrical device coupled to a coplanar transmission structure. The electrical element is positionable relative to the open end face of the carrier and housing with the electrical element being positionable away from the open end face, extend to the open end face, or extend past the open end face of the carrier and module. The electrical apparatus may also include a mounting dielectric substrate on which is secured the electrical element. The mounting dielectric substrate may be positioned away from the open end face of the carrier or housing, extend to the open end face of the carrier or housing, or extend past the open end face of the carrier or housing. The electrical element may be positioned away from the end face of its mounting dielectric substrate, extend to the end face of its mounting dielectric substrate, or extend past the end face of its mounting dielectric substrate. The coplanar transmission structure on the electrical element is independently aligned in a proximate abutting relationship with a corresponding coplanar transmission structure formed on an opto-electrical element of the mating opto-electrical apparatus or module. The carrier and housing of the electrical apparatus and module are linearly and rotationally positionable relative to the mating opto-electrical apparatus and housing in three mutually perpendicular planes to align the matching coplanar transmission structures in the proximate abutting relationship. Securing members mounted on the carrier and housing of the electrical apparatus and housing mechanically couple the electrical apparatus and module with the mating opto-electrical apparatus and module. The matching coplanar transmission structures on the electrical element and the opto-electrical element are electrically coupled together using substantially flat electrical conductors. The electrical apparatus and module may also be configured with a standoff dielectric substrate abutting the electrical element. The standoff dielectric substrate is positioned between the electrical element and the open end face of the carrier and housing of the electrical apparatus and module.

It will be obvious to those having skill in the art that many changes may be made to the details of the above-described embodiments of this invention without departing from the underlying principles thereof. The scope of the present invention should, therefore, be determined only by the following claims.

What is claimed is:

1. A butt joined electrical apparatus for coupling millimeter wavelength frequency electrical signals to and from a mating opto-electrical apparatus comprising:

a carrier having an open end face and an electrical element positioned on the carrier with an electrical device formed on at least one horizontal surface of the electrical element;

a coplanar transmission structure formed on at least one horizontal surface of the electrical element being electrically coupled to the electrical device, the coplanar transmission structure being independently aligned in three mutually perpendicular planes and in a proximate abutting relationship with another coplanar transmission structure formed on an opto-electrical element positioned on an open end face carrier of the mating opto-electrical apparatus;

the carrier of the electrical apparatus and carrier of the opto-electrical apparatus being independently positioned in a proximate abutting relationship at the open end faces and mechanically joined together as a single module by a securing member with the carrier of the electrical apparatus and carrier of the opto-electrical apparatus being linearly and rotationally positionable in three mutually perpendicular planes relative to each other to align the coplanar transmission structures of the electrical apparatus and the opto-electrical apparatus; and substantially flat electrical conductors electrically coupling the coplanar transmission structures of the electrical apparatus and the opto-electrical apparatus together.

2. The butt joined electrical apparatus as recited in claim 1 wherein the electrical element has an end face and the butt joined electrical apparatus further comprises a standoff dielectric substrate positioned on the open end face carrier and having opposing vertical end walls and at least one horizontal surface with a coplanar transmission structure formed on at least one horizontal surface and extending to the vertical end walls with one of the opposing vertical end walls abutting the end face of the electrical element and the coplanar transmission structure on the electrical element and the coplanar transmission structure on the standoff dielectric substrate being coplanar and electrically coupled via substantially flat electrical conductors.

3. The butt joined electrical apparatus as recited in claim 2 further comprising a mounting dielectric substrate having an end face, with the mounting dielectric substrate mounted on the open end face carrier having the standoff dielectric substrate and the abutting electrical element positioned thereon.

4. The butt joined electrical apparatus as recited in claim 2 wherein the coplanar transmission structure on the electrical element and the coplanar transmission structure on the standoff dielectric coplanar transmission structure are impedance and dimensionally matched.

5. The butt joined electrical apparatus as recited in claim 2 wherein the coplanar transmission structure of the standoff dielectric substrate is an impedance maintaining dimensional transition coplanar waveguide structure.

6. The butt joined electrical apparatus as recited in claim 1 wherein the open end face carrier further comprises a housing having sidewalls and end walls and a cavity formed in the housing bounded on three sides by the sidewalls and one of the end walls with the cavity intersecting the other end wall defining an open end face on the housing with the electrical element positioned in the cavity at the open end face of the housing.

7. The butt joined electrical apparatus as recited in claim 6 wherein the electrical element has an end face and the butt joined electrical apparatus further comprises a standoff dielectric substrate positioned in the cavity of the housing and having opposing vertical end walls and at least one horizontal surface with a coplanar transmission structure formed on at least one horizontal surface and extending to the vertical end walls with one of the opposing vertical end walls abutting the end face of the electrical element and the coplanar transmission structure on the electrical element and the coplanar transmission structure on the standoff dielectric substrate being coplanar and electrically coupled via substantially flat electrical conductors.

8. The butt joined electrical apparatus as recited in claim 7 wherein the coplanar transmission structure on the electrical element and the coplanar transmission structure on the standoff dielectric coplanar transmission structure are impedance and dimensionally matched.

9. The butt joined electrical apparatus as recited in claim 7 wherein the coplanar transmission structure of the standoff dielectric substrate is an impedance maintaining dimensional transition coplanar waveguide structure.

10. The butt joined electrical apparatus as recited in claim 1 further comprising a mounting dielectric substrate having an end face, with the mounting dielectric substrate mounted on the open end face carrier having the electrical element positioned thereon.

11. The butt joined electrical apparatus as recited in claim 1 wherein the electrical device comprises at least a first sampling diode.

12. The butt joined electrical apparatus as recited in claim 1 wherein the electrical device comprises a laser driver.

13. A butt joined electrical module for coupling millimeter wavelength frequency electrical signals to and from a mating opto-electrical module comprising:

a housing having sidewalls and end walls and a cavity formed in the housing bounded on three sides by the sidewalls and one of the end walls with the cavity intersecting the other end wall defining an open end face on the housing with an electrical element positioned in the cavity of the housing having an electrical device formed on at least one horizontal surface of the electrical element;

a coplanar transmission structure formed on at least one horizontal surface of the electrical element and being electrically coupled to the electrical device, the coplanar transmission structure being independently aligned in three mutually perpendicular planes and in a proximate abutting relationship with another coplanar transmission structure formed on an opto-electrical element positioned in a cavity of a similar open end face housing of the mating opto-electrical module;

the housing of the electrical module and housing of the opto-electrical module being independently positioned in a proximate abutting relationship at the open end faces and mechanically joined together as a single module by a securing member with the open end face housing of the electrical module and open end face housing of the opto-electrical module being linearly and rotationally positionable in three mutually perpendicular planes relative to each other to align the coplanar transmission structures of the electrical module and the opto-electrical module; and substantially flat electrical conductors electrically coupling the coplanar transmission structures of the electrical module and the opto-electrical module together.

14. The butt joined electrical module as recited in claim 13 wherein the electrical element has an end face and the butt joined electrical module further comprises a standoff dielectric substrate positioned in the cavity of the open end face housing and having opposing vertical end walls and at least one horizontal surface with a coplanar transmission structure formed on at least one horizontal surface and extending to the vertical end walls with one of the opposing vertical end walls abutting the end face of the electrical element and the coplanar transmission structure on the electrical element and the coplanar transmission structure on the standoff dielectric substrate being coplanar and electrically coupled via substantially flat electrical conductors.

15. The butt joined electrical module as recited in claim 14 further comprising a mounting dielectric substrate having an end face, the mounting dielectric substrate mounted in the cavity of the open end face housing having the standoff dielectric substrate and the abutting electrical element positioned thereon.

16. The butt joined electrical module as recited in claim 14 wherein the coplanar transmission structure on the electrical element and the coplanar transmission structure on the standoff dielectric coplanar transmission structure are impedance and dimensionally matched.

17. The butt joined electrical module as recited in claim 14 wherein the coplanar transmission structure of the standoff dielectric substrate is an impedance maintaining dimensional transition coplanar waveguide structure.

18. The butt joined electrical module as recited in claim 13 further comprising a mounting dielectric substrate having an end face, the mounting dielectric substrate mounted in the cavity of the open end face housing and having the electrical element secured thereon.

19. The butt joined electrical module as recited in claim 13 wherein the electrical device comprises at least a first sampling diode.

20. The butt joined electrical module as recited in claim 13 wherein the electrical device comprises a laser driver.

21. The butt joined electrical module as recited in claim 13 wherein the open end face housing further comprise a removable top cover mounted on the end wall and the sidewalls bounding the cavity.

* * * * *